United States Patent
Gard

(12) 
(10) Patent No.: US 6,642,807 B1
(45) Date of Patent: Nov. 4, 2003

(54) COAXIAL PROBE FOR HIGH TEMPERATURE AND HIGH PRESSURE APPLICATIONS

(75) Inventor: Alan Moravec Gard, Warrenville, IL (US)

(73) Assignee: Magnetrol International Incorporated, Downers Grove, IL (US)

( * ) Notice: Subject to any disclaimer, the term of this patent is extended or adjusted under 35 U.S.C. 154(b) by 0 days.

(21) Appl. No.: 10/134,885

(22) Filed: Apr. 29, 2002

(51) Int. Cl.[7] .................................. H01P 5/00
(52) U.S. Cl. .................. 333/24 R; 333/245; 73/866.5
(58) Field of Search ...................... 333/24 R, 160, 333/26, 245; 73/866.5, 304 R, 304 C

(56) References Cited

U.S. PATENT DOCUMENTS

| | | | | |
|---|---|---|---|---|
| 4,569,228 A | * | 2/1986 | Bellgardt et al. | 73/866.5 |
| 5,481,197 A | * | 1/1996 | Sanders et al. | 324/690 |
| 5,955,684 A | * | 9/1999 | Gravel et al. | 73/866.5 |
| 6,118,282 A | * | 9/2000 | Grieger | 324/637 |
| 6,148,681 A | * | 11/2000 | Gravel et al. | 73/866.5 |
| 6,386,055 B1 | * | 5/2002 | Eason | 73/866.5 |

* cited by examiner

*Primary Examiner*—Timothy P. Callahan
*Assistant Examiner*—An T. Luu
(74) *Attorney, Agent, or Firm*—Wood, Phillips, Katz, Clark & Mortimer

(57) ABSTRACT

A guided wave radar probe defines a transmission line for use with a measurement instrument including a pulse circuit connected to the probe for generating pulses on the transmission line and receiving reflected pulses on the transmission line. The probe includes a center conductor for conducting the pulses. A conductive outer sleeve is coaxial with the center conductor. The conductive outer sleeve has a process end and a connector end. The process end is exposed, in use, to a process environment being measured. A first cylindrical seal element between the center conductor and the outer sleeve is at the sleeve process end. The first cylindrical seal element is of a first material adapted to withstand a relatively high temperature. A second cylindrical seal element is between the center conductor and the outer sleeve disposed between the first cylindrical seal element and the connector end. The second cylindrical seal element is of a second material adapted to withstand a lower temperature than the first cylindrical seal element.

23 Claims, 2 Drawing Sheets

COAXIAL PROBE FOR HIGH TEMPERATURE AND HIGH PRESSURE APPLICATIONS

FIELD OF THE INVENTION

This invention relates to guided wave radar measurement instruments and, more particularly, to a probe for a guided wave radar measurement instrument.

BACKGROUND OF THE INVENTION

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and lost cost time domain reflectometry (TDR) instruments.

In a TDR instrument, a very fast pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

The design of a GWR liquid level measurement probe for steam and other high temperature/pressure applications requires a seal assembly that satisfies both mechanical and electrical requirements. Mechanically, the seal must simultaneously be resistant to the corrosive effect of steam, withstand process temperatures of 600° F. and above, pressures in excess of 2000 psi, and carry the tensile and bending loads induced by a center conductor extending into the process vessel. Electrically, the seal assembly must be electrically transparent to the radar signal to allow proper functioning of the system. In addition, the mechanical design affects the electrical characteristics so that the two are interrelated.

Plastic materials, such as PTFE, are often used as process seals for lower temperature and lower pressure probes. Plastic has a low dielectric constant. This permits the design to achieve the needed electrical impedance within dimensional constraints imposed by conventional ¾" inch NPT process connections while maintaining adequate structural integrity. Sealing of the plastic process seal is usually performed by o-rings. However, plastic material and o-rings are not capable of withstanding the high temperatures encountered in steam service, and the like.

Ceramic materials offer high temperature capability and resistance to temperature and steam. However, sealing ceramics to metals is difficult and the ceramic materials are susceptible to cracking under thermal shock. Typically, ceramic seals are brazed to the metal. However, the coefficients of thermal expansion for ceramics are much less than for high temperature and pressure steels. The large differences in the amount that the ceramic and steel expand and contract between the braising, steam service and room temperature results in large stresses. These stresses tend to damage the ceramic and/or the braised joint. Even a pin hole leak in the ceramic or braising will cause the probe to fail. Compensating for the thermal expansion differences results in complex and costly seal designs.

The present invention is directed to overcoming one or more of the problems discussed above, in a novel and simple manner.

SUMMARY OF THE INVENTION

In accordance with the invention, a probe is reliably sealed without susceptibility to thermal shock while providing transparency for electrical signals.

Broadly, in accordance with one aspect of the invention, a probe defines a transmission line for use with a measurement instrument including a pulse circuit connected to the probe for generating pulses on the transmission line and receiving reflected pulses on the transmission line. The probe includes a center conductor for conducting the pulses. A conductive outer sleeve is coaxial with the center conductor. The conductive outer sleeve has a process end and a connector end. The process end is exposed, in use, to a process environment being measured. A first cylindrical seal element between the center conductor and the outer sleeve is at the sleeve process end. The first cylindrical seal element is of a first material adapted to withstand a relatively high temperature. A second cylindrical seal element is between the center conductor and the outer sleeve disposed between the first cylindrical seal element and the connector end. The second cylindrical seal element is of a second material adapted to withstand a lower temperature than the first cylindrical seal element.

Further features and advantages of the invention will be readily apparent from the specification and from the drawings.

DETAILED DESCRIPTION OF THE INVENTION

Figure 1:
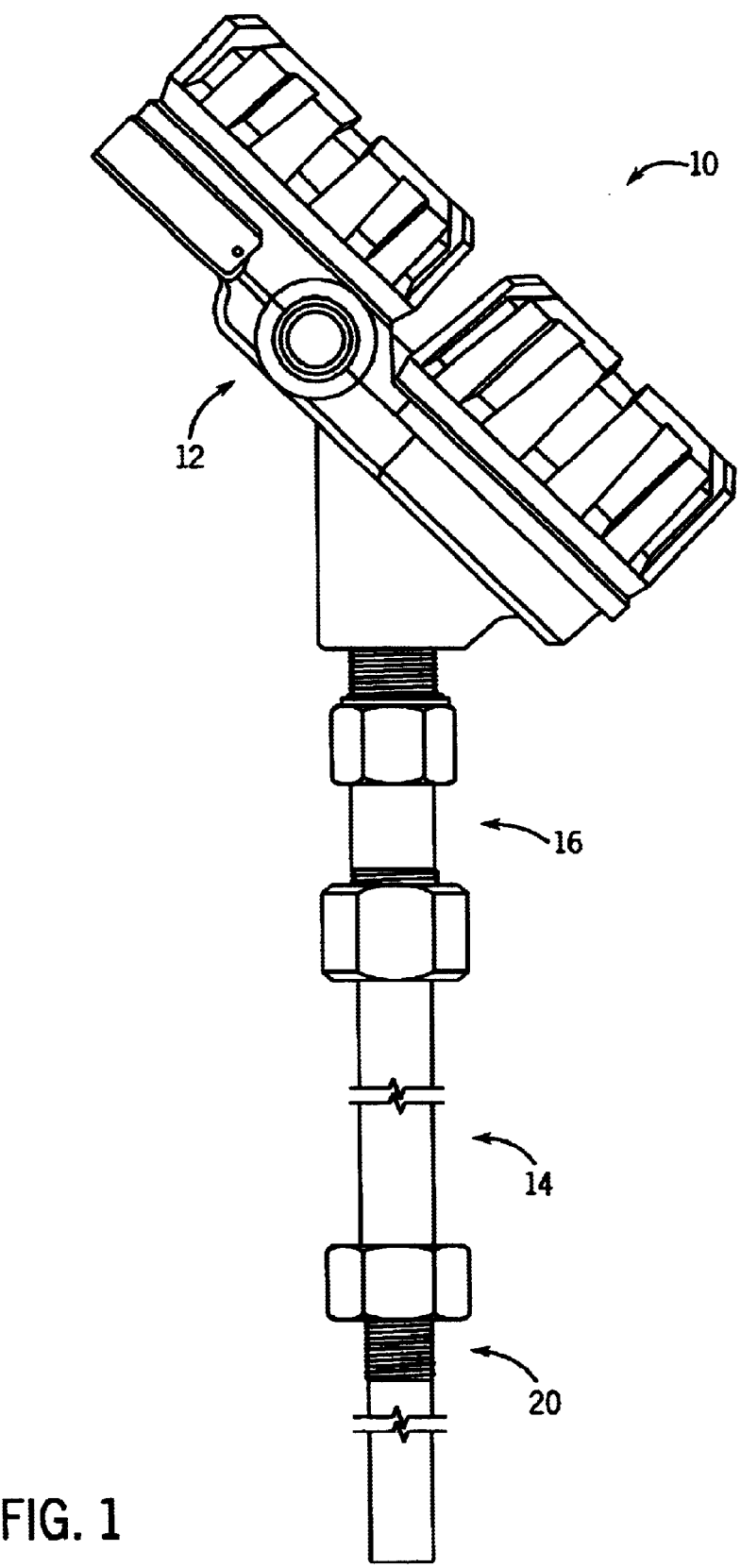
FIG. 1 is an elevation view of a measurement instrument including a probe in accordance with the invention.

Referring to FIG. 1, a level measuring process instrument 10 according to the invention as illustrated. The process instrument 10 uses micropower impulse radar (MIR) in conjunction with equivalent time sampling (ETS) and ultra-wide band (UB) transceivers for measuring level. Particularly, the instrument 20 uses guided wave radar for sensing level. While the embodiments described herein relates to a MIR level sensing apparatus, various aspects of the invention may be used with other types of process instruments for measuring various process parameters.

The process instrument 10 includes a control housing 12, a probe 14 and a connector 16 for connecting the probe 14 to the control housing 12. The probe 14 is typically mounted to a process vessel 18, see FIG. 2, using a threaded fitting 20. The housing 12 is then secured to the probe 14 as by threading the connector 16 to the probe 14 and to the housing 12. The housing 12 and connector 16 may be as generally described in Mulrooney, et al., U.S. Pat. No. 6,062,095, issued May 16, 2000, the specification of which is hereby incorporated by reference herein. As described therein, a probe comprises a high frequency transmission line which, when placed in a fluid, can be used to measure level of the fluid. Particularly, the probe is controlled by electronics in the housing 12 for determining level in the vessel 18.

Figure 3:
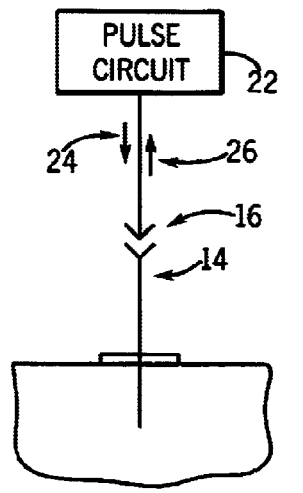
FIG. 3 is a generalized block diagram illustrating operation of the measurement instrument of FIG. 1.

The electronics mounted in the housing 12 may be, for example, as described in Carsella, et al., U.S. application Ser. No. 09/336,194, filed Jun. 18, 1999, the specification of which is hereby incorporated by reference herein, or as described in Benway, et al., U.S. application No. Ser. 09/878,895, filed Jun. 11, 2001, the specification of which is also incorporated by reference herein. As described in each of the two referenced applications, electronics in the control housing 12 includes a pulse circuit 22, see FIG. 3, connected to the probe 14. The pulse circuit 22 generates pulses, represented by an arrow 24, on the transmission line and receives reflected pulses, represented by an arrow 26, from the transmission line. The reflected pulses represent impedance changes on the transmission line.

Figure 2:
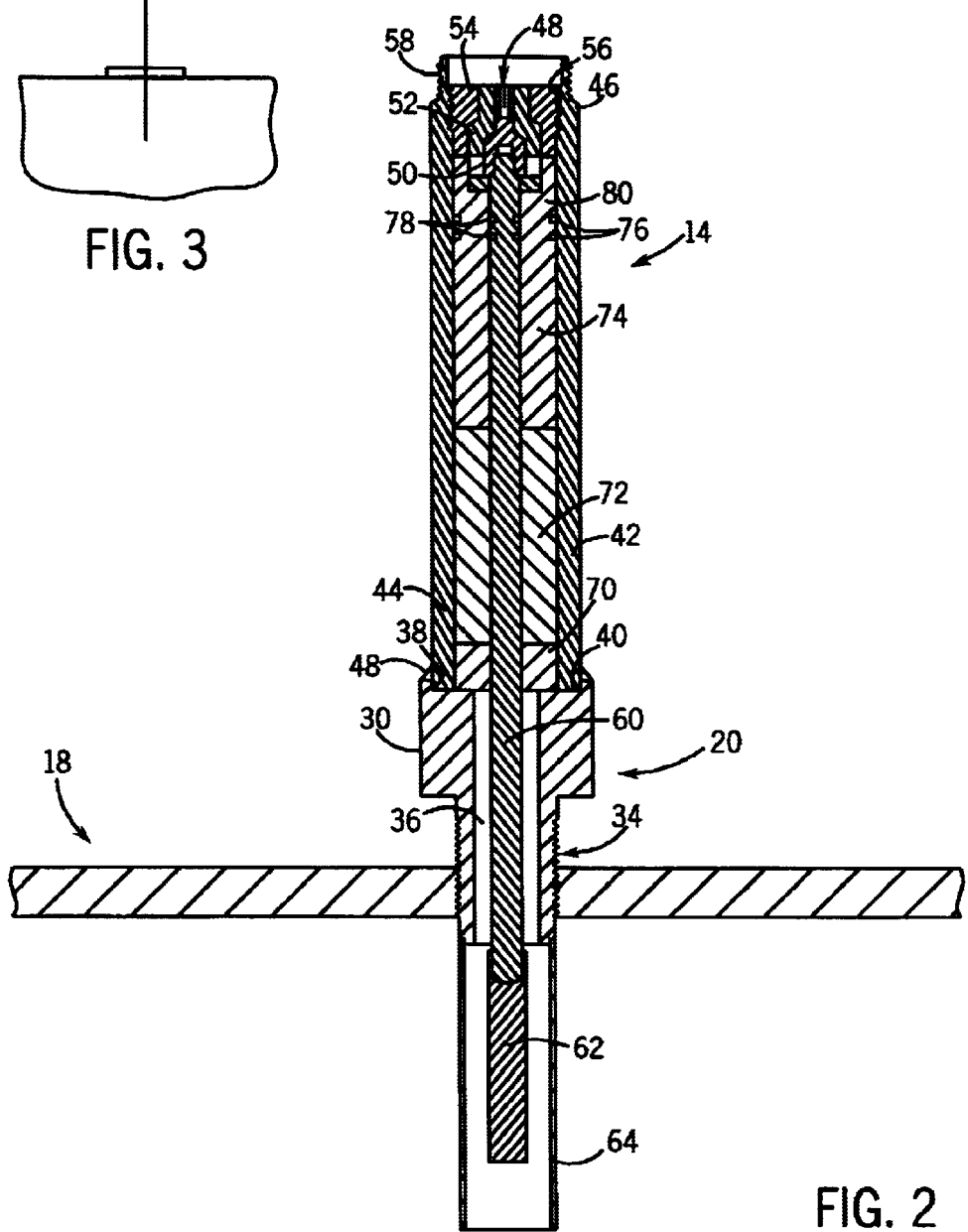
FIG. 2 is a sectional view of the probe of FIG. 1 mounted to a process vessel.

Referring to FIG. 2, the probe 14 is illustrated in greater detail. The probe 14 includes a seal assembly, as described, which reliably seals the probe 14 without susceptibility to thermal shock while providing transparency for electrical signals.

The probe 14 includes the adapter fitting 20 having a nut 30 at an upper end and an NPT thread 32 at a lower end for securing the probe 14 to the process vessel 18. The adapter fitting 20 includes a cylindrical through opening 36 and a counter bore 38 at the upper end defining a shoulder 40. The adapter fitting 20 is constructed of metal.

A metal, tubular outer sleeve 42 has a process end 44 and a connector end 46. The outer sleeve process end 40 is connected to the adapter fitting 20. Particularly, the outer sleeve 42 is received in the counter bore 38 abutting the shoulder 40 and is secured thereto as by a weld joint 48. The inner wall of the outer sleeve 42 includes threads 56 at the connector end 46 to receive an electrical connector 48.

The electrical connector 48 includes a female connector pin 50. The electrical connector 48 defines a quick connect using the pin 50 for connection to the pulse circuit 22, see FIG. 3. An insulating bushing 52 centers the center pin 50 and is held in place with a lock nut 54 threaded into the outer sleeve inner threads 56. The outer sleeve 42 also includes outer threads 58 at the connector end 46 for threading the probe 14 to the connector 16, see FIG. 1.

A metal center shaft 60, defining a center conductor, is received in the female connector pin 50 and is secured thereto in a conventional manner. As such, the center conductor 60 is coaxial with the outer sleeve 42 and also the adapter fitting 20. The center conductor 60 is of a length so that it extends downwardly through the adapter fitting 20.

The probe 14 further comprises an extender shaft 62 connected to the center conductor 60 and extending downwardly into the vessel 18. An extender outer sleeve 64 is coaxial with the extender shaft 62 and is connected to a lower end of the adapter fitting 20. The length of the extender shaft 62 and extender outer sleeve 64 depend on the particular application.

As described, the pulse circuit 22 is connected to the probe 14 via the electrical connector 48. The pulse circuit 22 generates pulses on the transmission line, defined by the center conductor 60 and extender shaft 62, and also receives reflected pulses on the transmission line. The outer sleeve 42, adapter fitting 20, and extender outer sleeve 64 act as a ground.

In accordance with the invention, the probe 14 is provided with an improved seal assembly adapted to be impervious to process fluid and to provide a temperature drop to ensure that all seal elements are capable of withstanding temperatures they are exposed to.

Particularly, the seal assembly comprises a ceramic seal element 70, first and second plastic seal elements 72 and 74, respectively, a set of outer o-rings 76 and a set of inner o-rings 78. The seal elements 70, 72 and 74 are generally cylindrical having an outer diameter slightly less than an inner diameter of the outer sleeve 42 to be received therein. The seal elements 70, 72 and 74 also have inner diameters slightly greater than an outer diameter of the center conductor 60 for receiving the same. The ceramic seal element 70 is positioned at the outer sleeve process end 44 resting on the adapter fitting shoulder 40. The first plastic seal element 72 is abutting the ceramic seal element 70. The second plastic seal element 74 is abutting the first plastic seal element 72 having its upper end 76 proximate the outer sleeve connector end 46. As described, the seal elements 70, 72 and 74 are loosely received in the outer sleeve 42 and are captured between the adapter fitting 20 and the electrical connector 48. The outer o-rings 76 are between the second plastic seal element 74 and the outer sleeve 42. The inner o-rings 78 are between the center conductor 60 and the second plastic seal element 74. The o-rings 76 and 78 comprise elastomeric o-rings. The sets of o-rings 76 and 78 are positioned longitudinally above a center position of the second plastic seal element 74.

Together the seal elements 70, 72 and 74, the center conductor 60 and outer sleeve 42 form a coaxial transmission line with an integral high temperature, high pressure seal. The seal elements 70, 72 and 74 are designed to be impervious to process fluids and to provide a temperature drop to ensure that the individual seal elements 70, 72 and 74 are capable of withstanding the temperatures they are exposed to. Particularly, the ceramic seal element 70, being directly exposed to the process material, is adapted to withstand a relatively high temperature compared to the plastic seal elements 72 and 74.

The center conductor 60 carries and guides the probe pulse in a conventional manner. The outer sleeve 42 provides the process connection, pressure boundary and ground path for the electrical signal. The ceramic seal element 70 and plastic seal elements 72 and 74 are placed end to end between the center conductor 60 and outer sleeve 42 and perform several functions. Particularly, they serve to position the center conductor 60 along the center line axis of the outer sleeve 42, create a fiducial signal, control impedance and provide a thermal barrier between the process fluid and the o-ring seals 76 and 78.

The ceramic seal element 70 is positioned at the process interface at the outer sleeve process end 44. The ceramic seal element 70 provides high temperature and steam resistance. The ceramic material blocks the steam from freely traveling up the length of the probe. Heat is lost to the ambient atmosphere through convection and radiation from the outer sleeve 42, resulting in a temperature drop going up the probe. The length of the ceramic seal element 70 provides a sufficient temperature drop so that the temperature at the interface with the first plastic seal element 72 is below the maximum of service temperature of the plastic material.

Because the ceramic seal element 70 is loose, but captured within the outer sleeve 42, as described, the ceramic material is subjected to only pressure and thermal shock stresses. The ceramic material is unaffected by the pressures encountered in steam service. Since no seal is made between the metal parts and the ceramic, if the ceramic material cracks due to thermal stress, then the seal integrity is not compromised. The electrical performance is also unaffected by cracks.

The plastic seal elements 72 and 74 act similarly to the ceramic seal element 70. They are of sufficient length to result in a temperature drop such that the temperature at the o-rings 76 and 78 is within the allowable rating for the o-ring elastomeric material. Plastic materials are inherently resistant to cracking from thermal shock, so that the overall design is highly resistance to rapid changes in temperature as might be encountered if the probe 14 is installed into a hot chamber.

Because sealing is accomplished by the o-rings 76 and 78 at the upper end of the seal assembly, some process fluid can migrate into the spaces between the seal elements 70, 72 and 74, and the o-rings 76 and 78. Clearances between the center conductor 60, seal element 70, 72 and 74, and outer sleeve 42 are kept minimal to reduce the amount of fluid permitted in the seal region. A small amount of fluid does not significantly affect the electrical performance of the seal assembly. Additionally, thermal expansion coefficient of the plastic is higher than that of the steel shaft center conductor 60 and the outer sleeve 42.

The geometry and dielectric constant of the plastic seal elements 72 and 74 creates a drop in impendence with respect to the nominal impedance of the probe and coaxial cable system. The impendence drop at the top of the probe 14 produces a fiducial signal from which level measurements are referenced. Since the electrical signal travels slower through the plastic seal elements 72 and 74, and the ceramic seal element 70, due to the higher dielectric constant of those materials, the fiducial signal is separated in time from the level pulse in all cases, permitting flooded cage operation. This design also reduces the complexity of the center conductor 60 since no undercut of the shaft is required to produce the fiducial signal.

The composition of the plastic seal elements 72 and 74 and the ceramic seal element 70, as well as their dimensions, may be varied to account for different process conditions such as temperature, pressure and process fluid. For example, the length of the ceramic seal element 70 could be increased relative to the plastic seal element 72 and 74 to allow operation at a higher temperature. The plastic seal element 72 and 74 could also be replaced entirely to permit usage of the seal assembly at temperatures or pressures too high for plastic elements.

In an illustrative example, the probe 14 includes a ceramic seal element 70 that is approximately one half inch long. The first plastic seal element 72 is two inches long and the second plastic seal element 74 is 2.5 inches long. This configuration provides temperature capability to approximately 600° F. For temperature ranges up to 550° F., all three seal elements 70, 72 and 74 could be made from high temperature plastic with the same overall length as just described. To provide temperature capability above 600° F., the overall length of the seal elements can be increased by adding additional ceramic elements 70 of one half inch length. Each additional one half inch length ceramic seal element provides approximately a 50° F. increase in maximum allowable temperature.

For higher temperature and/or pressure applications, or for process fluids that are not compatible with plastic seal elements, the seal elements 72 and 74 may comprise ceramic seal elements. Alumina ceramic, for example, can be machined to a sufficiently low surface finish to permit sealing by the O rings 76 and 78. The electrical characteristics of alumina ceramic are such that the fiducial signal would be generated in the same manner as with the use of plastic seal elements. Ceramic seal elements have higher allowable compressive stress levels and service temperatures compared to plastics. Hence, an all ceramic design is capable of increased temperature and pressure limits.

The illustrative example described above uses the minimum amount of ceramic necessary for temperature compatability while minimizing manufacturing costs as ceramic is more expensive than an equivalent amount of plastic.

Thus, in accordance with the invention, there is provided a probe having an improved seal assembly that is not susceptible to thermal shock while providing transparency for electrical signals.

I claim:

1. A probe defining a transmission line for use with a measurement instrument including a pulse circuit connected to the probe for generating pulses on the transmission line and receiving reflected pulses on the transmission line, the probe comprising:

a center conductor for conducting the pulses;

a conductive outer sleeve coaxial with the center conductor, the conductive outer sleeve having a process end and a connector end, the process end being exposed, in use, to a process environment being measured;

a first cylindrical seal element between the center conductor and the outer sleeve at the sleeve process end, the first cylindrical seal element being of a first material adapted to withstand a relatively high temperature; and a second cylindrical seal element between the center conductor and the outer sleeve disposed between the first cylindrical seal element and the connector end, the second cylindrical seal element being of a second material adapted to withstand a lower temperature than the first cylindrical seal element.

2. The probe of claim 1 wherein the first cylindrical seal element comprises a ceramic seal element.

3. The probe of claim 1 wherein the second cylindrical seal element comprises a plastic seal element.

4. The probe of claim 1 further comprising a first elastomeric seal between the center conductor and the second cylindrical seal element and a second elastomeric seal between the second cylindrical seal element and the outer sleeve.

5. The probe of claim 4 wherein the first and second elastomeric seals comprise o-rings.

6. The probe of claim 1 wherein the second cylindrical seal element comprises two plastic seal elements.

7. The probe of claim 1 further comprising an adapter mounted to the sleeve at the process end and an electrical connecter at the connector end capturing the first and second seal elements in the outer sleeve.

8. A probe defining a transmission line for use with a measurement instrument including a pulse circuit connected to the probe for generating pulses on the transmission line and receiving reflected pulses on the transmission line, the probe comprising:

a center conductor for conducting the pulses;

a conductive outer sleeve coaxial with the center conductor, the conductive outer sleeve having a process end and a connector end, the process end being exposed, in use, to a process environment being measured;

a cylindrical ceramic seal element between the center conductor and the outer sleeve at the sleeve process end; and first and second cylindrical plastic seal elements between the center conductor and the outer sleeve disposed axially aligned between the ceramic seal element and the connector end.

9. The probe of claim 8 further comprising a first elastomeric seal between the center conductor and the second cylindrical plastic seal element and a second elastomeric seal between the second cylindrical plastic seal element and the outer sleeve.

10. The probe of claim 9 wherein the first and second elastomeric seals comprise o-rings.

11. The probe of claim 8 further comprising an adapter mounted to the sleeve at the process end and an electrical connecter at the connector end capturing the seal elements in the outer sleeve.

12. A guided wave radar probe for use in high temperature high pressure process environments with a process instrument having a control housing assembly with a control connection comprising:

an elongate cylindrical hollow seal adapter receivable in an opening of the process vessel;

a conductive outer sleeve, the conductive outer sleeve having a process end and a connector end, the process end being connected to the adapter;

a center conductor coaxial with the outer sleeve and the adapter and connectable to the control connection, in use, for conducting and guiding guided wave radar electrical signals;

a first cylindrical seal element between the center conductor and the outer sleeve at the sleeve process end, the first cylindrical seal element being of a first material adapted to withstand a relatively high temperature;

a second cylindrical seal element between the center conductor and the outer sleeve disposed between the first cylindrical seal element and the connector end, the second cylindrical seal element being of a second material adapted to withstand a lower temperature than the first cylindrical seal element; and elastomeric seals between the center conductor and the second cylindrical seal element and between the second cylindrical seal element and the outer sleeve.

13. The guided wave radar probe of claim 12 wherein the first cylindrical seal element comprises a ceramic seal element.

14. The guided wave radar probe of claim 12 wherein the second cylindrical seal element comprises a plastic seal element.

15. The guided wave radar probe of claim 12 further comprising a first elastomeric seal between the center conductor and the second cylindrical seal element and a second elastomeric seal between the second cylindrical seal element and the outer sleeve.

16. The guided wave radar probe of claim 15 wherein the first and second elastomeric seals comprise o-rings.

17. The guided wave radar probe of claim 12 wherein the second cylindrical seal element comprises two plastic seal elements.

18. The guided wave radar probe of claim 12 further comprising an adapter mounted to the sleeve at the process end and an electrical connecter at the connector end capturing the first and second seal elements in the outer sleeve.

19. A probe defining a transmission line for use with a measurement instrument including a pulse circuit connected to the probe for generating pulses on the transmission line and receiving reflected pulses on the transmission line, the probe comprising:

a center conductor for conducting the pulses;

a conductive outer sleeve coaxial with the center conductor, the conductive outer sleeve having a process end and a connector end, the process end being exposed, in use, to a process environment being measured;

a plurality of cylindrical seal elements between the center conductor and the outer sleeve, the seal elements being mounted in series between the sleeve process end and the connector end, the one seal element at the process end being of ceramic.

20. The probe of claim 19 wherein the plurality of cylindrical seal elements all comprise ceramic seal elements.

21. The probe of claim 19 wherein the other cylindrical seal element comprise a plastic seal elements.

22. The probe of claim 19 further comprising a first elastomeric seal between the center conductor and the cylindrical seal element at the connector end and a second elastomeric seal between the cylindrical seal element at the connector end and the outer sleeve.

23. The probe of claim 22 wherein the first and second elastomeric seals comprise o-rings.

* * * * *